United States Patent Office 2,974,444
Patented Mar. 14, 1961

2,974,444
INDUCED MALE STERILITY IN TOMATOES

Channing B. Lyon, Abington, and Dougal Harold McRae, Hatboro, Pa., assignors to Rohm & Haas Company, Philadelphia, Pa., a corporation of Delaware No Drawing. Filed Jan. 28, 1959, Ser. No. 789,511

4 Claims. (Cl. 47—58)

This invention concerns the production of hybrid tomato seed. It is based on the discovery that certain chlorinated aliphatic acids and their water-soluble salts, specifically 2,3-dichloroisobutyric acid and its water-soluble salts, adversely affect the production of fertile pollen in the tomato flower without apparent detrimental effect upon the ovules. These compounds are employed to produce male sterility in tomato plants.

It has been known that significant improvement in plant characteristics and yield of tomatoes can be obtained by the use of hybrid seed. Tomato geneticists have also long realized that, if male-sterility could be induced or imparted to tomato plants, a more economical production of hybrid tomato seed would be possible with a consequent more widespread use of hybrids throughout the tomato processing industry. The high cost of hybrid tomato seed has been one of the major factors which has seriously limited its commercial use.

One method used for producing male sterility is hand emasculation, but this method is laborious and expensive. It has also been proposed that suitable male steriles might be found in one of the parents of the hybrid by searching in large field populations. This is also a laborious task since their normal incidence has been estimated at about 0.05 percent. Male sterility might also be induced in one of the parents by irradiation, but the difficulties and inherent dangers of large scale irradiation are readily apparent.

A method of inducing male sterility by the application of a chemical to the tomato plant has long been sought, since, if such a method were found, hybrid seed could be produced without emasculation and without the delay necessitated by further breeding work.

It is also known that the compounds of the kind found useful in the practice of this invention affect in one way or another the growth characteristics of many plants. Some of them have been proposed for use as herbicides or to otherwise control undesirable plant growth. They have not, however, heretofore been known to have selective action on the development or functioning of the male or female gametes.

The present invention is based upon the discovery that, when used on tomatoes in the manner hereinafter described, these compounds so affect the flowering of the plant that there are produced flowers otherwise normal but containing little or no pollen or containing a sterile or substantially sterile pollen. By so including male-sterility while preserving fertile ovules, plant specimens are obtained which are admirably suited for cross-pollination.

In practicing the invention, the area in which the hybrid seed is to be produced is planted with at least two varieties of tomato plants. The varieties may be of the same species or may be varieties of different species. Thus the variety Early Chatham may be crossed with the variety Manitoba. There are no limitations on the varieties of tomatoes which can be crossed, in the sense that the only limitation is the number of permutations and combinations which are possible with the various Lycopersicon species and varieties within species of tomato plants which exist. Tests on other varieties are set forth hereinafter. The term "variety" as hereinafter used should be understood as meaning subspecies of a species and also, if there be a species without recognized subspecies, then the species itself is the sole variety of the species. The two or more varieties may be planted in such manner that all plants of each variety are in close proximity with each other, preferably in alternate rows or in an arrangement of two rows of the variety to be rendered male-sterile alternating with one row of the second variety. Such arrangements allow for ready access to each variety with power-driven equipment but this invention does not depend on the particular arrangement and any other systematic mixed planting of the area may be practiced which, on the one hand, places the two varieties sufficiently close to each other for a readily available supply of pollen, yet sufficiently separated to allow for the spraying or dusting of one variety without harmful contamination of the other.

In the case of tomatoes, cross-pollination by means of insects is not always particularly successful and, frequently, if other nectar-bearing plants are in the near vicinity of the tomato plants, bees will shun the tomato flowers. Under such conditions, hand pollination may be resorted to. When hand pollination is employed, it is not necessary that the rows of plants be in an alternating arrangement. One plot or field of tomato plants may be sprayed to induce male sterility or produce so-called "female plants," and these can then be pollinated with pollen collected from a plot or field of unsprayed or so-called "male" plants. Hand pollination is a well-known procedure in plant breeding and consists in transferring pollen from one plant to another by brushing on or otherwise applying the pollen from the male plant to the female.

To effect male-sterility or substantial male-sterility in one of the varieties, that variety is treated with the compounds hereinbefore set forth by spraying or dusting. The rate of application should be such as to substantially affect the male gametophytes but insufficient to cause substantial injury to the plant. This will depend to a large degree on other factors, such as the age of the plant and climatic conditions, and to some degree upon the particular species being treated, it having been observed that all species do not give equal response to apparently identical treatment. The optimum dosage will also vary with the particular compound being used as they are not all equally active and some are more phytotoxic to the tomato plant than others. A good practical rule is to apply the compound at a rate at which slight injury to the plant occurs from which it will recover, or at a rate slightly below the point of injury. In the case of 2,3-dichloroisobutyric acid, our experience has been that injury to the tomato plant begins to show at an application rate of about two pounds per acre. At double this rate, the injury is significant, but the plants recover. A simple test on one or two plants will readily show whether the particular spray concentration and application rate cause severe injury. In the case of species more susceptible to injury or when application is made under circumstances conducive to plant injury, the dosage may be applied in two or more sprayings or dustings with only a portion of the total dosage in each application whereby the concentration of active principle in the plant system is built up in stages or is maintained at an effective level. Useful results are obtainable at considerably lower rates and, particularly when repeat spraying is practical, as little as one pound or even less per acre will produce chemical-emasculation. Under some conditions, however, substantially higher rates of application are necessary and up to 10 pounds per acre will be required.

The compounds should be applied as a water-solution or as dust. The concentration of active ingredient in the water is less important than the rate of application of active ingredient per acre of treated area and may vary over a wide range from 0.1% or even up to 5%, with the lower concentrations being particularly useful when two or more applications are made. We prefer a concentration of from 0.1% to 2%. By means of repeated sprays, it is possible to keep the flowers of the sprayed plant male sterile throughout the entire life of the plant.

Wetting agents, such as dodecylbenzene sodium sulfonate, sodium dodecyl sulfate, dodecyltrimethylammonium chloride, or an octylphenoxypolyethoxyethanol may be added, if desired, but such agents have a tendency to increase the phytotoxicity of the spray.

For the preparation of suitable dusts, the active ingredient is combined with inert carriers, such as finely particled clays, talc, pyrophyllite, diatomaceous earth, and magnesium carbonate with or without the addition of dispersing or wetting agents.

These compounds are absorbed by and they or their derivatives are translocated within the plant and their effectiveness remains for several weeks after application. It has been observed that treating the soil with these compounds before or after planting results in the compounds being absorbed by the plant and producing physiological responses. Preferably, the chemicals are applied after the plants have become established but about ten days before the first flower buds have opened. The effect of the chemical appears to be on the pollen mother cell since it influences reduction division of the pollen mother cell and the timing of spray application should be governed by the desired period of male sterile flower production.

Test data have also established that the physiological responses of tomatoes to the sodium salt of 2,3-dichloroisobutyric acid are characteristic of the responses induced by the class of compounds hereinbefore set forth. While some variation is to be expected among the different specific chemicals, even as such variation exists among the different varieties of tomatoes, these variables or their practical effect can be reduced considerably, if not eliminated, by following one of the rules heretofore mentioned of determining the dosage which will cause severe injury on a few plants in the area to be treated and applying a dosage sufficiently below this level to be safe either by reducing the total amount of chemical applied or by applying it in two or more sprayings of safe dosages each. When repeat applications are made, care must be observed to prevent a build-up of the chemical in the plant system to the point where serious toxic effects are produced. It is also within the purview of this invention to use different specific chlorinated aliphatic acids or their salts in the different sprays when a plurality of sprays are to be applied as is also the use of a mixture of these chemicals in a single spray.

Since, by the proper use of the chlorinated aliphatic acids and their salts, male-sterility can be induced in the tomato plant, it is now possible to hybridize two varieties or species of tomatoes by treating the one type in the manner herein described and cross-pollinating from the untreated second type. It will be apparent from the foregoing that this invention does not constitute a particular cross-breeding of tomato strains but represents, rather, a general process for the preparation of hybrid tomato seeds from any two varieties or species of varieties of tomato plants. This invention makes available, on a quantity basis and at reasonable cost, hybrid tomato seed.

EXAMPLE I

In a series of preliminary greenhouse tests, tomato plants of the Rutgers variety, 60 days old, were sprayed to run-off with a 0.5 percent aqueous solution of sodium 2,3-dichloroisobutyrate. Twenty days after treatment, the first "hands" were developing on the treated plants. At this time, there was a distinct, although mild, visual chlorosis of treated vegetative growth and a very slight marginal leaflet "burn." New leaflets were "crinkled" (as contrasted with their normal relatively smooth condition) and flower development was delayed on comparison with the untreated control plants. Mature flowers on untreated control plants were removed from these plants subsequent to anthesis and dissected to establish the normal appearance of the calyx, corolla, and staminate and pistillate parts.

Thirty days after treatment, the first flowers to open on the treated plants were removed and similarly dissected. It was obvious that the sepals and petals were lighter in color than those on comparable untreated control plants. The ovaries were smaller on the average and the style was shorter and thicker. The trilobed stigma had not separated. The staminate parts of the treated flowers were obviously and markedly adversely affected by the treatment. The staminate column which normally encloses the style had separated into individual stamens and the column had "opened up." The filaments were shortened and twisted and the anthers varied from colorless and non-dehiscing to brown, non-functional organs. The pollen in the least affected anthers was colorless and abnormal. The adverse effect of the sodium 2,3-dichloroisobutyrate on all anthers borne on all flowers produced on treated plants persisted for some thirty-one days thereafter. Subsequently, the floral condition gradually reverted to normal and functional pollen reappeared.

During the thirty-day period, when treated plants were producing male-sterile flowers, one "hand" was bagged in order to check the sterility of the pollen even though it was obviously non-functional by visual and microscopic examinations. All flowers on this "hand" abscissed and no fruit developed.

EXAMPLE II

In a subsequent greenhouse test, tomato seeds of the variety known as "146" were germinated in soil flats in the greenhouse. Eighteen seedlings were transplanted into six inch soil pots during the spring months and subsequently pruned of all axilliary growth at weekly periods. The plants were tied to bamboo sticks with cheesecloth.

Approximately ten days before the first flower buds had begun to elongate, three plants were sprayed to run-off with water solutions of sodium 2,3-dichloroisobutyrate with each of six concentrations of the chemical. The concentrations were 1.2%, 0.6%, 0.3%, 0.15%, 0.075%, and 0.0375%. The plants were examined daily, beginning ten days after the initial spray and the flowers were examined macroscopically and microscopically. All flowers on the three replicate plants treated with the lowest concentration were normal and produced viable pollen. The pollen was fertile as demonstrated by successfully out-crossing to untreated hand-emasculated flowers. All flowers produced by all plants treated with higher concentrations, i.e. 0.15 to 1.2%, produced flowers which were male sterile without exception. It was noticeable, however, that with the three highest concentrations, i.e. 0.3 to 1.2%, total flower production was progressively decreased and phytotoxicity became progressively more severe with increased spray concentration. The optimum concentrations under these particular greenhouse conditions were either 0.075% or 0.15%, since both produced male sterile flowers without exception and the ovaries retained their fertility since fruit set was obtained by cross-fertilization with normal pollen. Neither concentration resulted in any phytotoxic effect.

EXAMPLE III

Sodium 2,3-dichloroisobutyrate was tested on field tomatoes. The varieties Early Chatham, Earlinorth, Monarch, Mustang, Cavalier, Early Lethbridge, Early Hybrid, Manitoba, Bounty, Scotia, and Harrow were used. Spray treatments consisted of four concentrations (0.075, 0.15, 0.3 and 0.6 percent of sodium 2,3-dichloroisobutyrate in water), each applied at three dates (June 23, July 11, and July 29), and two unsprayed checks. Each spray was applied to a single-row plot which consisted of five plants of each of the eleven varieties. The tractor-mounted sprayer was operated at a pressure of 45 pounds per square inch to give an application rate of 80 gallons per acre.

The fertility status of blossoms was evalulated by weekly fruit counts. The June 23 data are given in Table I and the means presented represent the average number of fruits set per plant for the eleven varieties. In the 14-day period between twenty-one and thirty-five days after treatment, the increase in fruit set for the unsprayed check averaged 9.8 fruits per plant, in comparison with 10.0 fruits for the 0.075 percent concentration, 2.9 for the 0.15%, 0.9 for the 0.3 percent and 0.2 fruits for the 0.6 percent treatment. The 0.075 percent concentration did not induce sterility. The 0.15 percent concentration caused some reduction in fruit set and the 0.3 and 0.6 percent concentrations almost prevented further set. In the following 7-day period, fruit set increases were 30.6 for the check, 33.6 for the 0.075 percent, 25.8 for the 0.15 percent, 10.7 for the 0.3 percent, and 0.8 for the 0.6 percent. In this weekly period, the two low concentrations had little effect, the 0.3 percent an intermediate effect, and the 0.6 percent practically prevented set. The 1.0 fruit set increase in the three-week period for the 0.6 percent concentration treatment was attributed to the pretreatment fertilization and delayed expasnion of the fruit.

A different set of plants were sprayed with sodium 2,3-dichloroisobutyrate on July 11 when about four fruits were set per plant, and these data are shown in Table II. In the 17-day period between 17 and 34 days after treatment, the increase in fruit set was 44.0 fruits per plant for the check, 28.9 for the 0.075 percent concentration, 21.9 for the 0.15 percent, 5.9 for the 0.3 percent, and 2.6 for the 0.6 percent. Rate of fruit set was substantially reduced by the 0.3 percent treatment, and set was almost inhibited by the 0.6 percent treatment. In the following 7-day period, only 2.3 fruits set on the 0.6 percent concentration, but 14.9 fruits set on the 0.3 percent concentration indicating return to fertility.

Table I

[Average number of fruits set per plant on eleven tomato varieties, as influenced by four concentrations of sodium 2,3-dichloroisobutyrate, as applied on June 23, compared with an unsprayed check]

| Concentration of Sodium 2,3-Dichloroisobutyrate (Percent) | Days After Treatment | | | | | | |
|---|---|---|---|---|---|---|---|
| | 10 | 21 | 27 | 33 | 38 | 42 | 53 |
| 0.6 | 1.0 | 1.0 | 1.0 | 1.0 | 1.5 | 2.0 | 13.5 |
| 0.3 | 2.0 | 3.0 | 3.0 | 3.0 | 8.5 | 13.0 | 50.0 |
| 0.15 | 2.0 | 6.0 | 6.0 | 7.0 | 16.0 | 28.0 | 54.0 |
| 0.075 | 2.0 | 7.0 | 7.5 | 14.0 | 46.0 | 49.0 | 61.5 |
| Check | 2.0 | 6.0 | 7.0 | 14.0 | 48.0 | 54.0 | 57.0 |

Table II

[Average number of fruits set per plant on eleven tomato varieties, as influenced by four concentrations of sodium 2,3-dichloroisobutyrate, applied on July 11, compared with an unsprayed check]

| Concentration of Sodium 2,3-Dichloroisobutyrate (Percent) | Days After Treatment | | | |
|---|---|---|---|---|
| | 10 | 18 | 26 | 34 |
| 0.6 | 5.0 | 10.0 | 12.0 | 13.0 |
| 0.3 | 3.5 | 10.0 | 11.0 | 14.0 |
| 0.15 | 5.0 | 17.0 | 28.0 | 37.0 |
| 0.075 | 5.5 | 18.0 | 34.0 | 45.0 |
| Check | 3.5 | 13.0 | 47.0 | 58.0 |

The July 29 gametocide applications, which were applied to plants with an average set of 16 fruits, produced a fruit setting pattern similar to that for the two earlier treatments. At all three application dates the 0.6 percent concentration caused foliage yellowing within several days, reduced the growth rate, and inhibited pollen production almost immediately.

The male fertility status of treated plants was further evaluated by recording presence or absence of pollen and by testing the viability of any pollen produced, by application to emasculated flowers of unsprayed plants. Female fertility was evaluated by pollination with normal viable pollen obtained from unsprayed plants of the same variety. It was found that male sterile flowers could be identified by the lighter yellow color of the staminal tube. Results of this part of the experiment for the June 23 and July 11 application showed no male or female sterility attributable to the 0.075 percent concentrations. The 0.15 percent concentration induced a high degree of male sterility for about 13 days, beginning 15 days after treatment, but complete absence of pollen was never observed. A slight reduction in female fertility was apparent. The 0.3 percent concentration caused complete absence of pollen for about 12 days, beginning 12 days after treatment. During this period, about 30 percent of the flowers pollinated with normal pollen set fruit in contrast to about 50 percent of flowers on unsprayed check plants. Return to normal pollen production was gradual. By 37 days after treatment, pollen production was normal. This treatment caused a very slight reduction in female fertility as evaluated by fruit set to normal pollen on treated plants. The 0.6 percent concentration induced complete male sterility (absence of pollen) for a period of about 19 days, beginning 12 days after application. Pollen production was normal 37 days after treatment. No fruits were set with normal pollen applied to this 0.6 percent concentration treatment between 15 and 22 days after treatment so female sterility was assumed. Female fertility had returned 37 days after treatment.

The eleven tomato varieties tested did not differ appreciably in fruit setting response. The variety, Early Lethbridge, appeared slightly more susceptible to foliage yellowing and growth inhibition than the others. Almost complete male sterility with only slightly reduced female fertility was induced in all varieties by the application of 0.3 percent sodium 2,3-dichlorisobutyrate in water.

In a similar manner, at the same or lower or higher rates of application, other compounds may be used in the practice of this invention. Such compounds are those which in water-solution form anions of a chlorinated aliphatic acid which contains from three to four carbon atoms and two to four chlorine atoms. Specifically, these compounds are trichloroacrylic acid, 2,3-dichloropropionic acid, 2,2,3-trichloropropionic acid, 2,2-dichloropropionic acid and 2,2,3-trichloro-n-butyric acid, and dichlorosuccinic acid. These acids may be used as the free acid or in the form of their salts, examples of which are the sodium, potassium, iron, aluminum, cadmium, calcium, nickel, mercury, copper, zinc, manganese, and barium salts, and the ammonium salts formed with ammonia, amines or quaternary ammonium groups, including monomethylamine, dimethylamine, trimethylamine, the ethylamines, ethanolamine, dimethylethanolamine, morpholine, pyrrolidine, or pyridine, or such quaternary groups as tetramethylammonium, benzyltrimethylammonium, dibenzyldimethylammonium, methylpyridinium, or methylmorpholinium, didodecenyldimethylammonium, N-dodecyl-N-benzyl-N,N-dimethylammonium, N-dodecylbenzyl-N,N,N-trimethylammonium, or octylphenoxyethylbenzyldimethylammonium.

We claim:
1. The process of producing hybrid tomato seed which comprises treating one variety of tomato plant prior to the opening of the flower buds with a compound selected from the group consisting of 2,3-dichloroisobutyric acid and the water-soluble salts thereof, said compound being applied at a rate and at a concentration in a diluent medium below the rate and concentration which causes serious injury to the plant under the conditions existing at the time of application, continuing the growth of the thus treated plants, developing male sterile flowers thereon, causing the flower of said treated plant to be fertilized by pollen from a different variety of tomato plant, continuing the growth of these plants bearing the so-fertilized flowers to maturity, and separately collecting the seed of said mature fruit.

2. The process of producing hybrid tomato seed which comprises treating one variety of tomato plant prior to the opening of the flower buds with 2,3-dichloroisobutyric acid, said acid being applied at a rate and at a concentration in a diluent medium below the rate and concentration which causes serious injury to the plant under the conditions existing at the time of application, continuing the growth of the thus treated plants, developing male sterile flowers thereon, causing the flower of said treated plant to be fertilized by pollen from a different variety of tomato plant, continuing the growth of these plants bearing the so-fertilized flowers to maturity, and separately collecting the seed of said mature fruit.

3. The process of producing hybrid tomato seed which comprises treating one variety of tomato plant prior to the opening of the flower buds with sodium 2,3-dichloroisobutyrate, said salt being applied at a rate and at a concentration in a diluent medium below the rate and concentration which causes serious injury to the plant under the conditions existing at the time of application, continuing the growth of the thus treated plants, developing male sterile flowers thereon, causing the flower of said treated plant to be fertilized by pollen from a different variety of tomato plant, continuing the growth of these plants bearing the so-fertilized flowers to maturity, and separately collecting the seed of said mature fruit.

4. The process of producing hybrid tomato seed which comprises planting at least two varieties of tomatoes sufficiently separated to permit application of a chemical to one variety without substantial contact of the chemical with another variety, applying to but one of said varieties before the opening of the flower buds thereon a compound selected from the group consisting of 2,3-dichloroisobutyric acid and the water-soluble salts thereof, said compound being applied in water solution or other suitable carrier to said variety at a concentration of from about 0.1 to about 5% and at an application rate of from about 1 to about 10 pounds per acre, said concentration and said application rate being below the concentration and application rates which will cause serious injury to the plants being treated under the conditions existing at the time of treatment, allowing the plants to form flowers, fertilizing the flowers of said treated plants with pollen from an untreated variety of tomato plant, allowing said treated plants to mature, and separately collecting the seed from said treated mature fruit.

References Cited in the file of this patent

UNITED STATES PATENTS 2,889,662    Eaton et al. _____ June 9, 1959

OTHER REFERENCES

"The Structure of Economic Plants," (Haward), published by Macmillan (N.Y), 1938, pages 411–450 and 550–579 relied on.

Rehm: "Male Sterile Plants by Chemical Treatment," published July 5, 1952, in Nature (magazine) at London, England, vol. 170, No. 4314, pages 38 and 39.

Chemical Abstracts, vol. 46, published 1952, column 9673, article "Male Sterile Plants by Chemical Treatment."